H. H. DANIELS.
VENDING MACHINE.
APPLICATION FILED JAN. 8, 1909.

1,056,509.

Patented Mar. 18, 1913.
8 SHEETS—SHEET 1.

Witnesses:
J. R. Millward
Russel R. Vaughn

Inventor
Harry H. Daniels
By his Attorney
Joseph A. Stetson

H. H. DANIELS.
VENDING MACHINE.
APPLICATION FILED JAN. 8, 1909.

1,056,509.

Patented Mar. 18, 1913.
8 SHEETS—SHEET 4.

WITNESSES

INVENTOR
Harry H. Daniels
BY
Joseph A. Stetson
ATTORNEY

H. H. DANIELS.
VENDING MACHINE.
APPLICATION FILED JAN. 8, 1909.

1,056,509.

Patented Mar. 18, 1913.
8 SHEETS—SHEET 5.

Witnesses:
J. P. Millward
Russel K. Vaughn

Inventor
Harry H. Daniels
By his Attorney
Joseph A. Stetson

H. H. DANIELS.
VENDING MACHINE.
APPLICATION FILED JAN. 8, 1909.
1,056,509.
Patented Mar. 18, 1913.
8 SHEETS—SHEET 6.
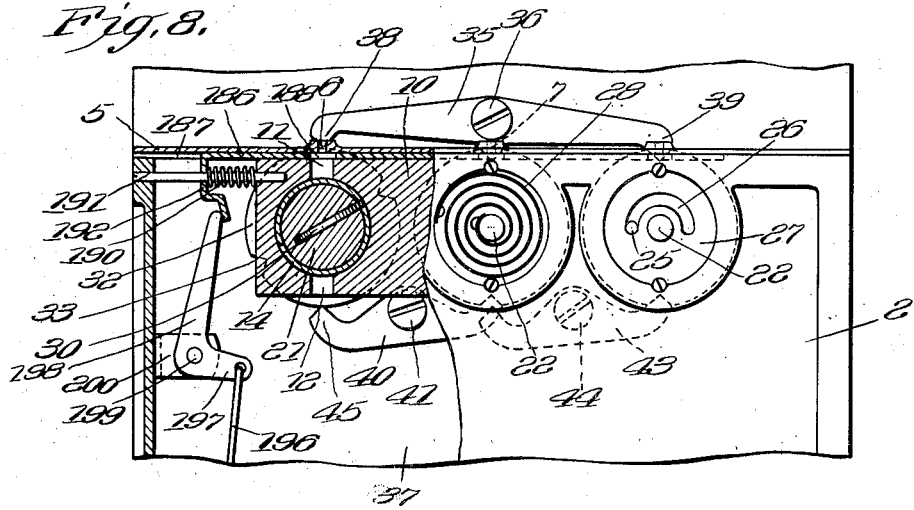
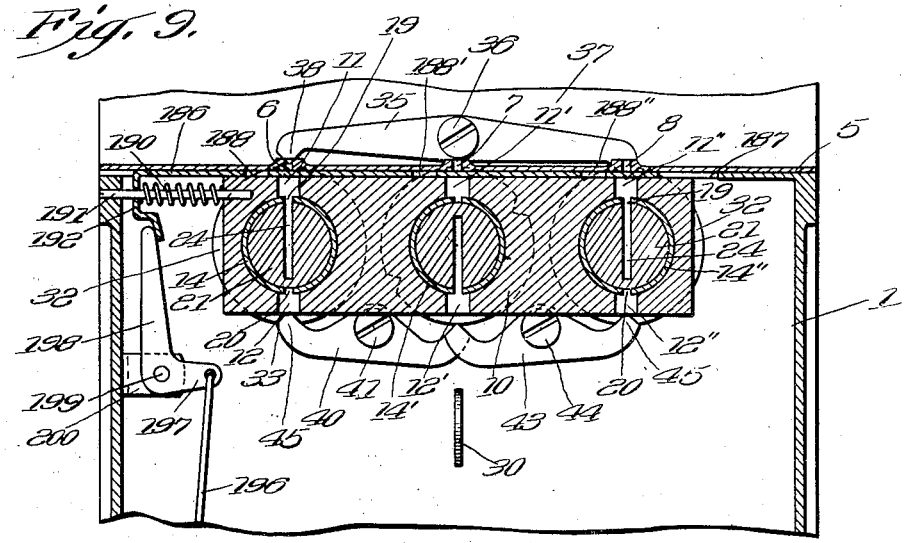
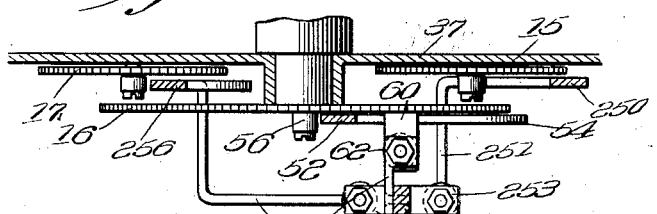
Witnesses:
J. W. Millward
Russel R. Vaughn
Inventor
Harry H. Daniels
By his Attorney
Joseph A. Stetson

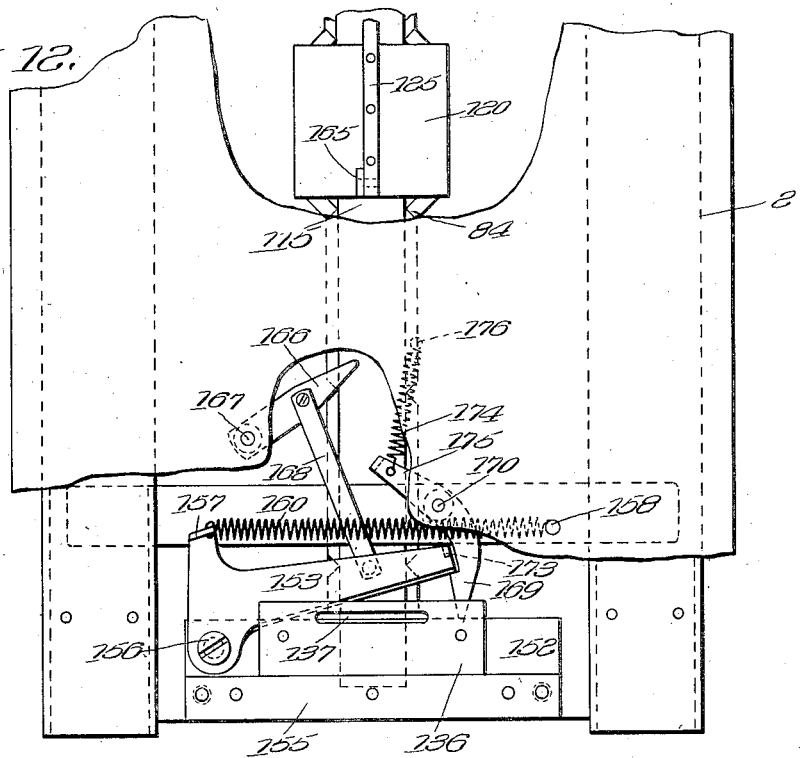

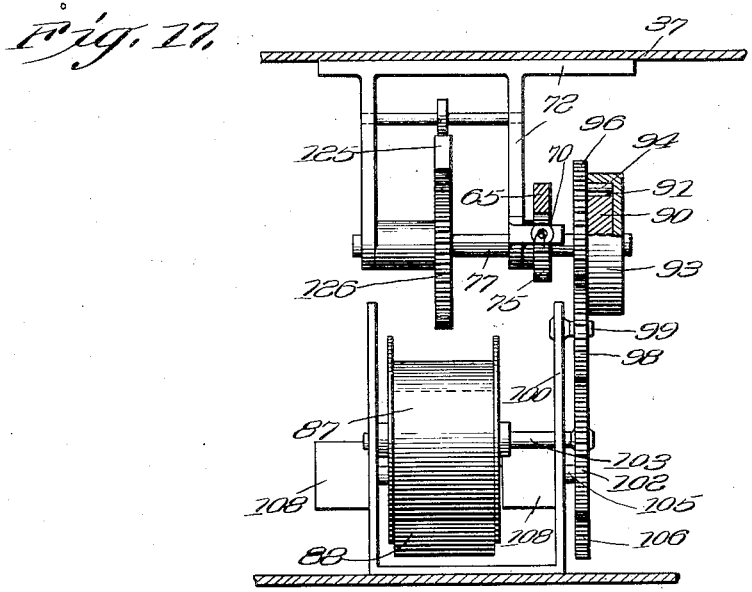
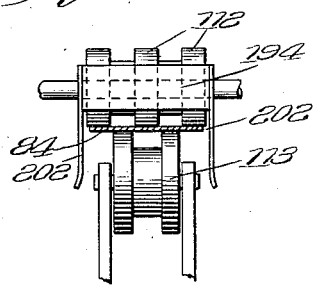
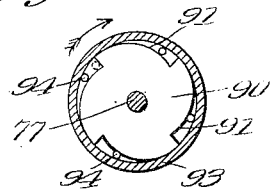
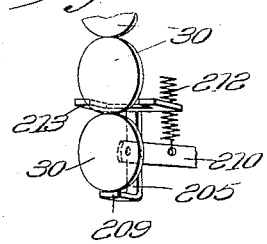
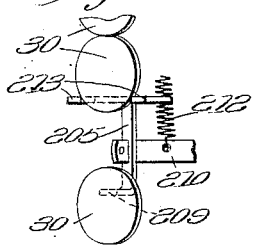

UNITED STATES PATENT OFFICE.

HARRY H. DANIELS, OF WINTHROP, MASSACHUSETTS, ASSIGNOR TO JOHN W. CAMPBELL, OF TEANECK, NEW JERSEY.

VENDING-MACHINE.

1,056,509.     Specification of Letters Patent.     Patented Mar. 18, 1913.

Application filed January 8, 1909. Serial No. 471,253.

*To all whom it may concern:*

Be it known that I, HARRY H. DANIELS, a citizen of the United States, residing at Winthrop, in the county of Suffolk and State of Massachusetts, have invented certain new and useful Improvements in Vending-Machines, of which the following is a specification.

My invention relates to coin-operated vending machines adapted to the sale and delivery of articles stored within the machine to an operator upon the insertion of the proper coin.

A desirable embodiment of my invention is shown applied to a machine for the vending of tickets, although many features thereof may be applied to vending machines for the sale of different articles.

The purpose of my invention is to provide devices for accurately delivering the articles vended in number varying in accordance with the value of the coin inserted; I also provide various means to prevent fraud or innocent error in the use of the machine.

The several details of my improvement and invention will be explained at length in the specification and designated particularly in the claims.

Figure 1:
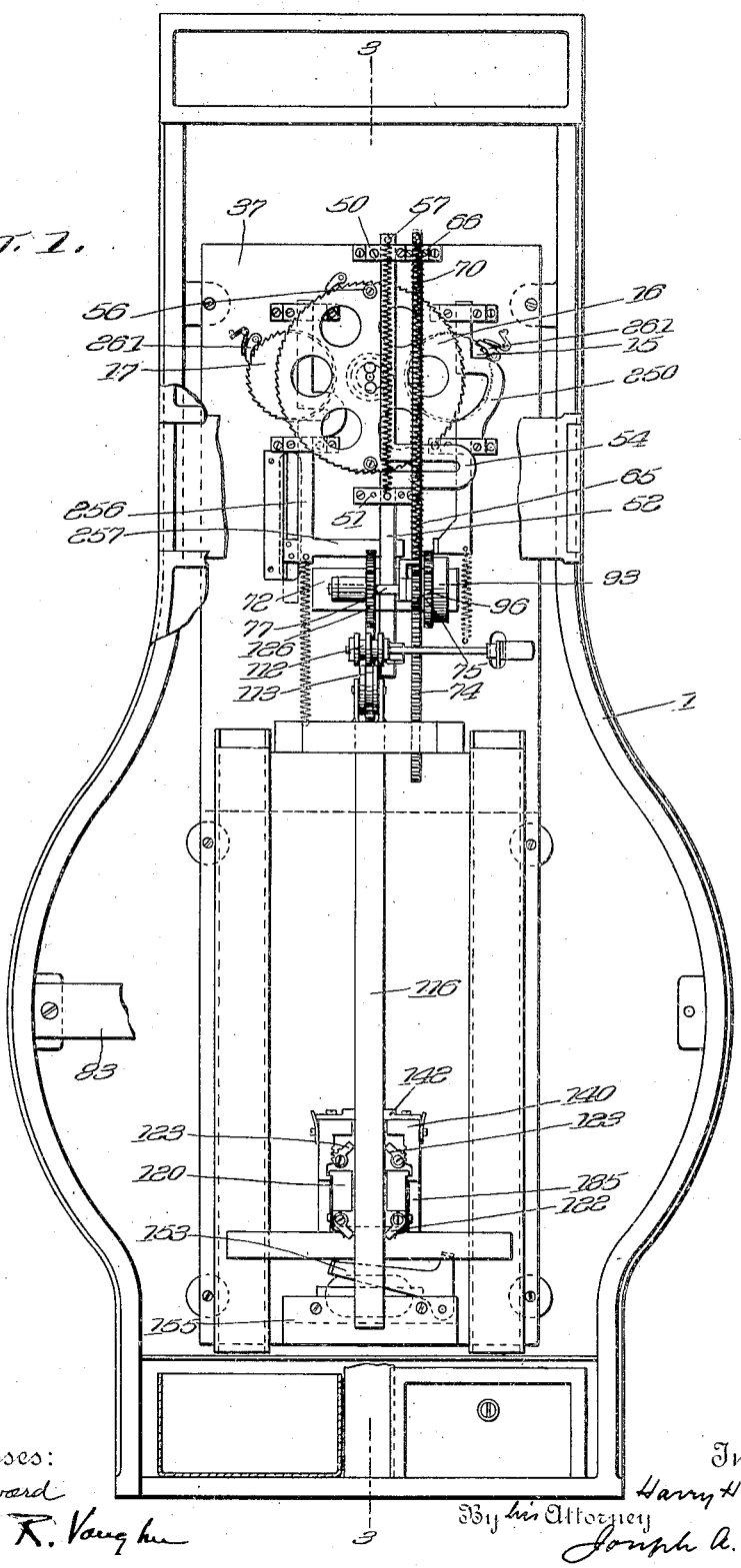
Figure 2:
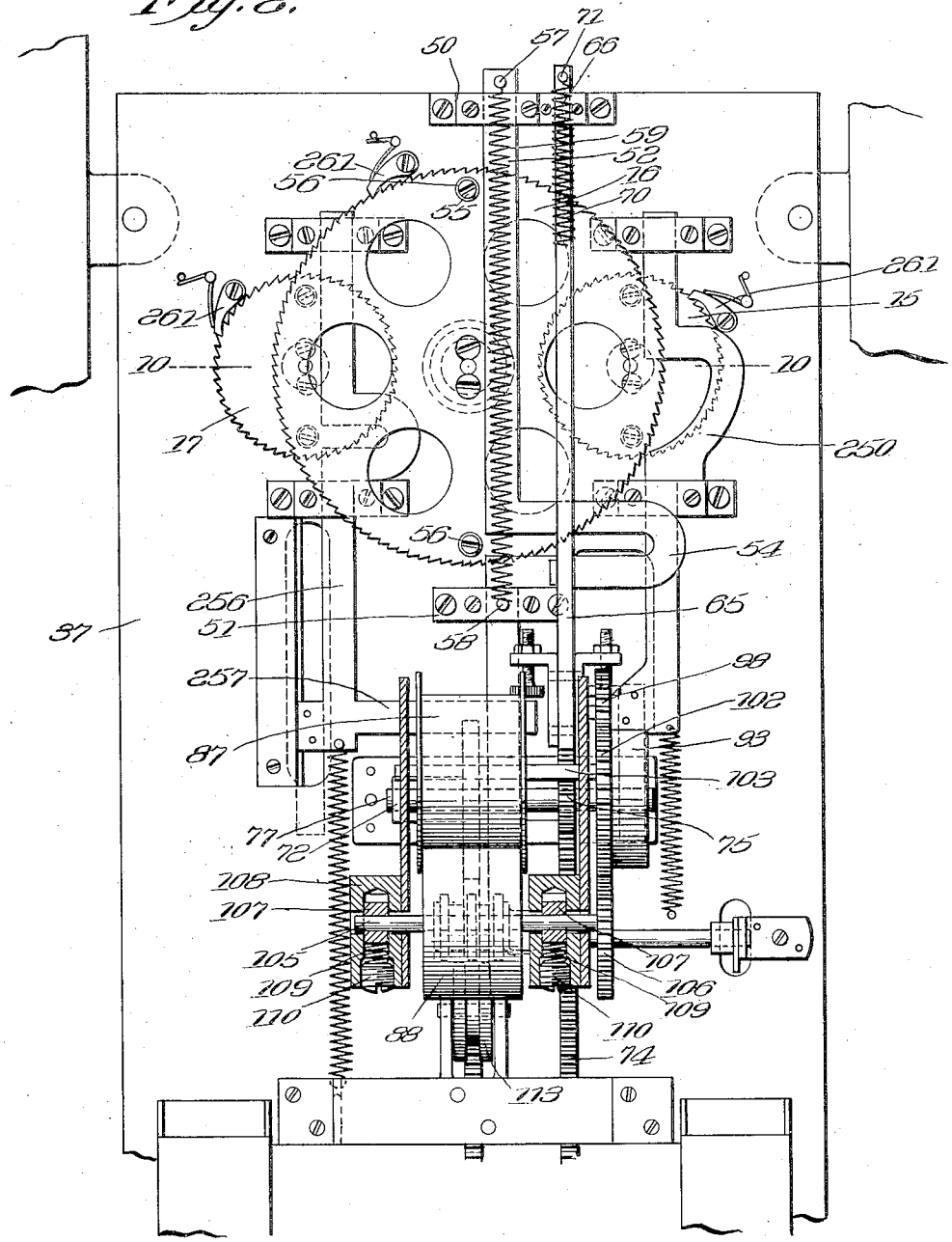
Figure 3:
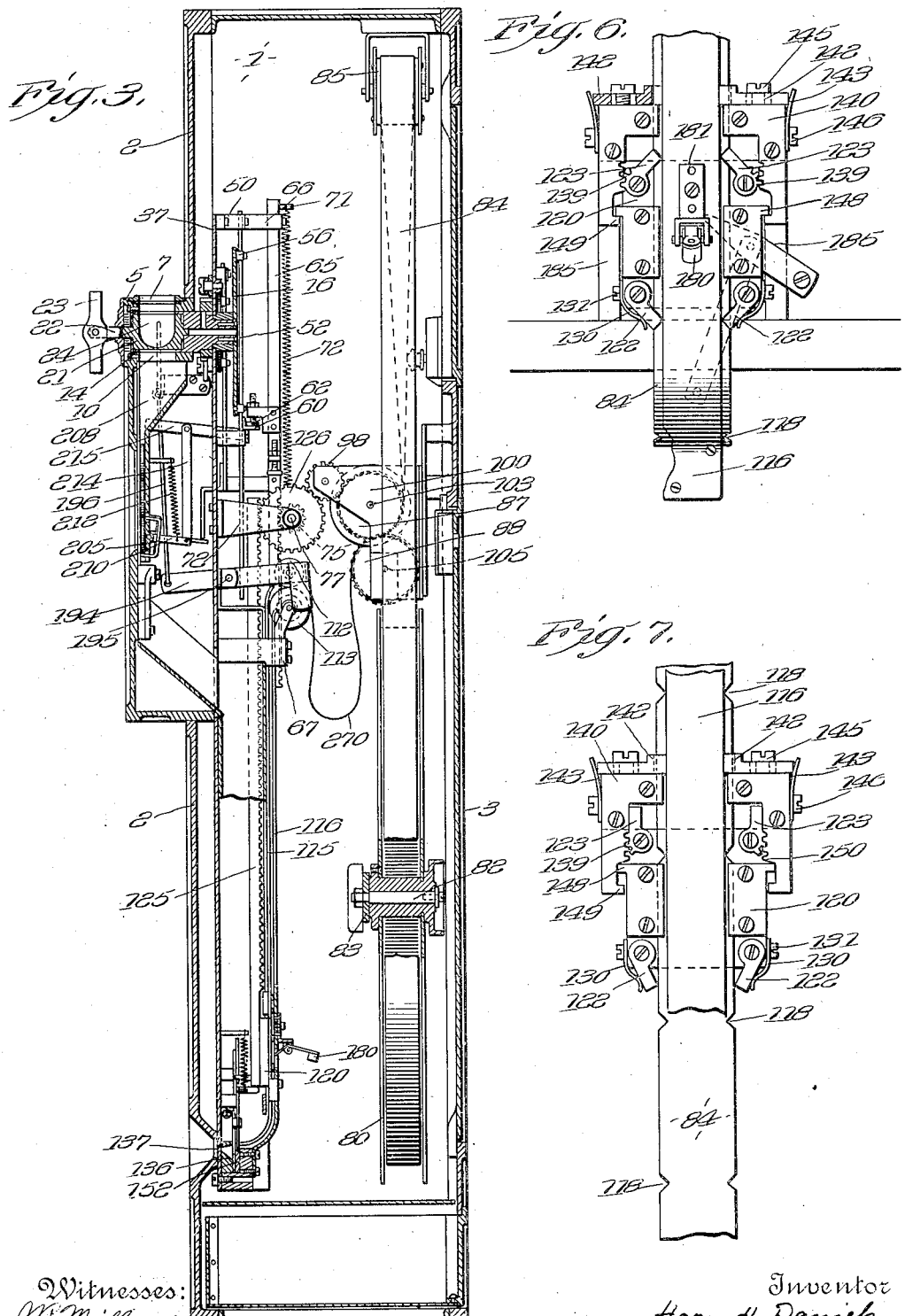
Figure 4:
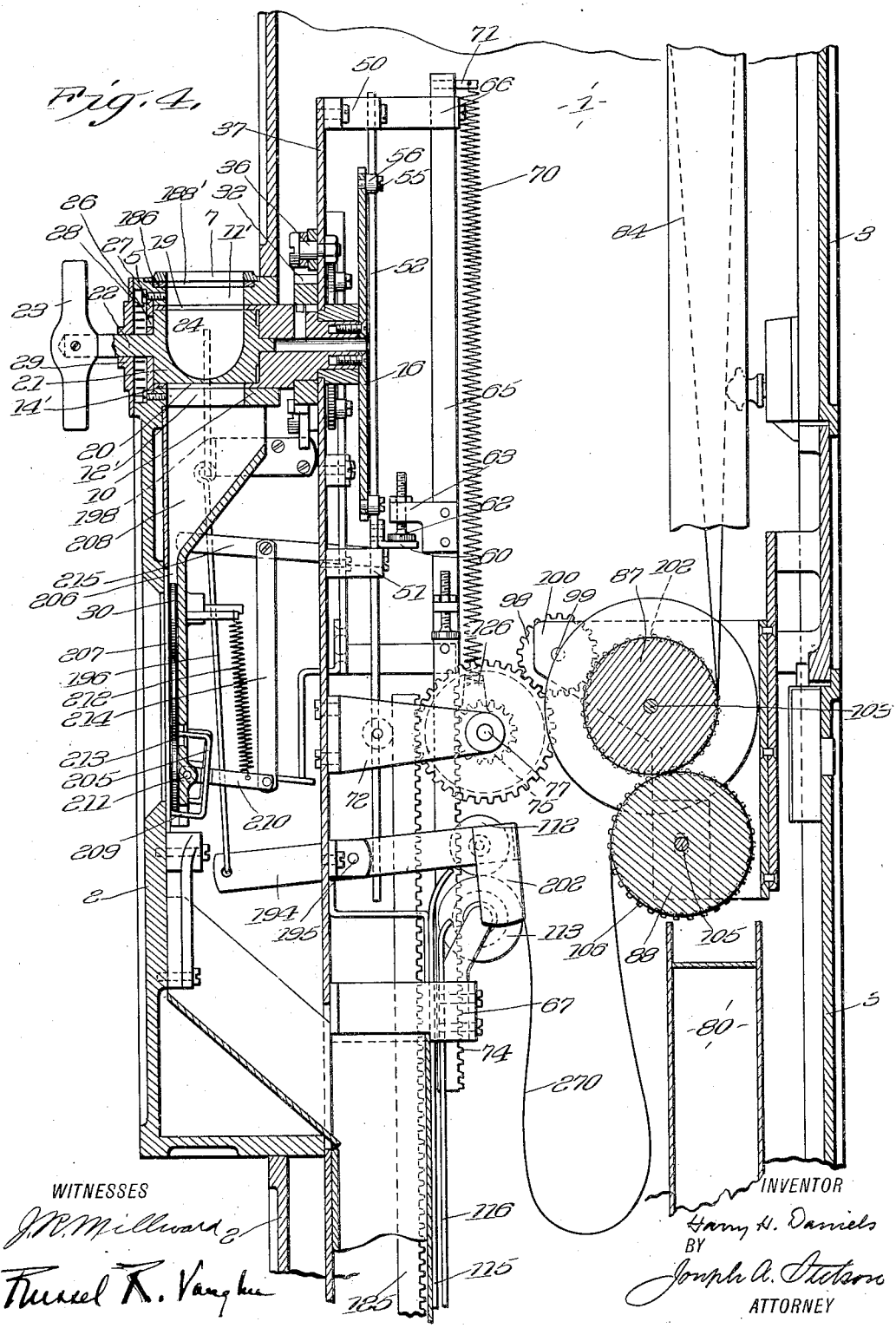
Figure 5:
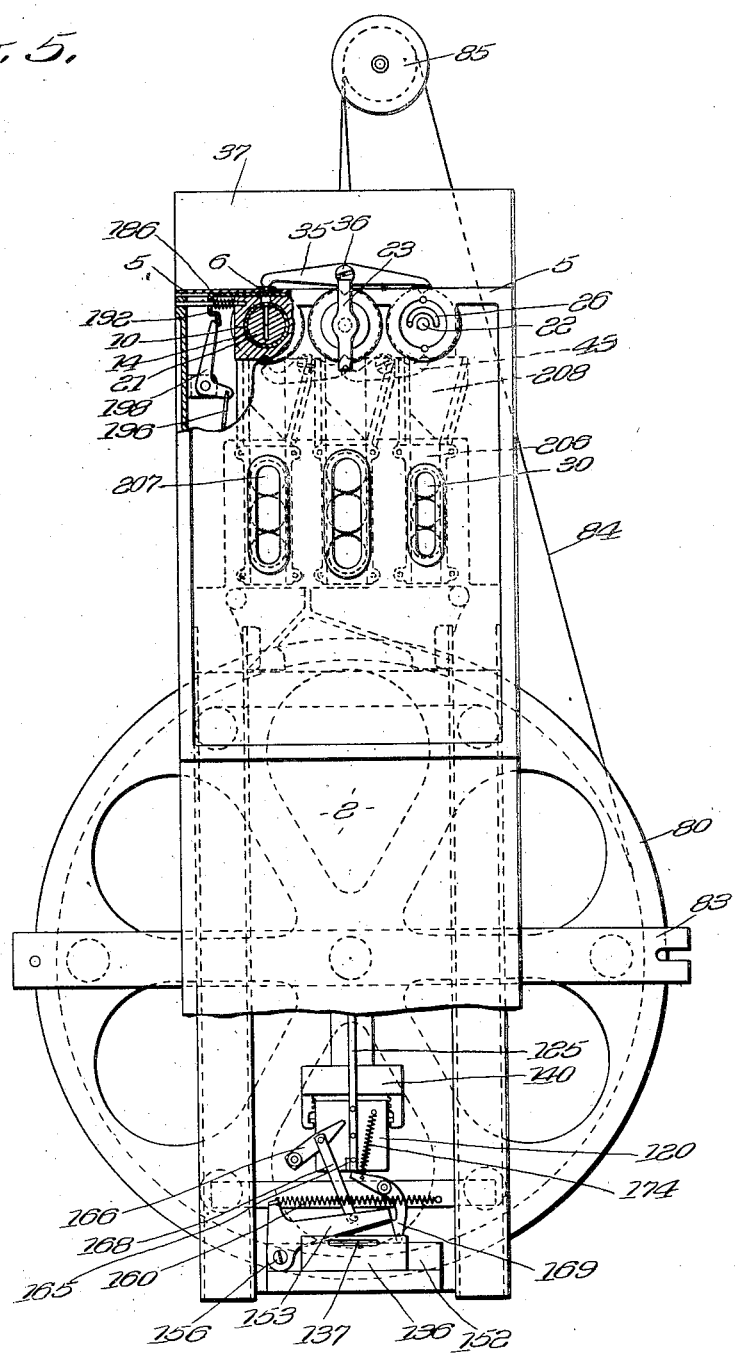

Figure 1 of the drawings is a rear view of many of the operating parts of the machine adjacent to the front of the casing, the rear casing and the coil of tickets being removed to show the parts at the front. Fig. 2 is an enlarged rear view of the upper portion of the parts shown in Fig. 1. Fig. 3 is a central vertical section of the entire apparatus, the section being on line 3—3 of Fig. 1, so far as the parts shown in said figure are shown in this figure. Fig. 4 is an enlarged vertical section of the upper portion of the features shown in Fig. 3. Fig. 5 is a front elevation of the apparatus with portions broken away showing the features in detail at the front of the machine. Fig. 6 is a detail rear view of the ticket delivery device, the parts being shown in normal position engaging the edges of the strip of tickets. Fig. 7 is a similar view, the parts being shown in a position of disengagement with the strip of tickets. Fig. 8 is a detail irregular vertical sectional view of the coin-receiving devices and adjacent parts looking from front to rear illustrating the slot-closing device and the locking device for the coin receiving cylinders, the parts being shown with the coin slots open and a 5¢ coin engaged for the delivery of one ticket. Fig. 9 is a view similar to Fig. 8, a 25¢ coin having been used for the sale of five tickets and the coin slots having been closed. Fig. 10 is a detail plan view on the line 10—10 of Fig. 2 illustrating the engagement of the lifting arms. Fig. 11 is a detail elevation of the lifting lug on the operating rack. Fig. 12 is an enlarged rear view of the ticket cutting knife in a raised position. Fig. 13 is a similar view, showing the knife in its lower position, after having cut the strip of tickets. Fig. 14 is an enlarged detail vertical sectional view of the parts at the bottom of the apparatus shown in Fig. 3. Figs. 15 and 16 are detail perspective views of the coin catching device. Fig. 17 is a partial plan view showing particularly the auxiliary feed mechanism. Fig. 18 is a detail sectional view of the clutch for the feeding mechanism. Fig. 19 is a detail view of the rollers for operating the slot closing device.

Referring to the drawings, 1 is the casing for the apparatus forming an inclosing box for the tickets and the feeding mechanism and provided with the front 2 and back 3. In the front is the projecting shelf 5 in which are located the coin slots 6, 7 and 8; the slot 6 being adapted for the insertion of a nickel or five cent coin, the slot 7 for a twenty-five cent coin and the slot 8 for a dime or ten cent coin.

The three coin receiving devices are all more or less similar and are best illustrated in Figs. 3, 4, 5, 8 and 9. They consist of an outer casing 10 having upper slots 11, 11′, 11″ and lower slots 12, 12′, 12″ located directly beneath the respective coin slots in the ledge 5. The outer casing 10 is fixed in position and has arranged therein the movable shells or cylinders 14—14′—14″ fixedly secured at their rear ends to operating disks 15—16—17 respectively for the five, twenty-five and ten cent coins. The movable shells 14, 14′, 14″ have oppositely positioned slots 19 and 20 and within said shells are the slotted cylinders 21 integrally connected by means of forwardly extending pins 22 with operating handles 23 at the front of the machine. Each slot or recess 24 in each operating cylinder 21 extends almost across the diameter thereof but is closed at one end; the depth of the slots being slightly less than the diameter of the coin to be received, so that on the insertion of the coin an operating cylinder 21 and its shell 14 will be engaged by the coin so as to rotate together. The rotation of a cylinder 21 is stopped in either direction by a pin 25, extending forwardly from the cylinder, meeting the ends of a curved groove 26 in plate 27 secured by screws to the casing 10 (Figs. 4 and 8). When, after rotation of a handle 23 by an operator, the coin is freed from the device as illustrated in Fig. 9 the inner cylinder 21, pin 22 and handle 23 are returned to their initial positions ready for the reception of the next coin by means of the coiled springs 28 (Figs. 4 and 8) one end of which is secured to the pin 22 and the other end to the casing 10. The cap 29 covers the spring 28. 30 represents the coin employed to operate the apparatus. To secure two of the shells 14, 14′, 14″ against rotation during the operation of the third shell each shell has an annular projecting collar 32 having oppositely positioned notches 33 adapted to be engaged by suitable locking levers. The upper locking lever 35 is pivoted upon a pin 36 (Figs. 4, 5, 8 and 9) secured to the vertical stationary plate 37. This upper locking lever 35 has two downwardly projecting noses 38 and 39. The lower locking lever 40 is pivoted upon pin 41 likewise secured to the fixed plate 37; while lower locking lever 43 is pivoted upon pin 44 which is also secured to the plate 37. The ends of the two lower locking levers 40 and 43 have upwardly projecting noses 45. I will refer first to the parts operated by a twenty-five cent coin for the delivery of five tickets to the operator each of the value of five cents. These parts are centrally located. The operation of the devices for the delivery of tickets upon the insertion of a five or ten cent piece is similar and will be referred to hereinafter. Secured to the vertical fixed plate 37 are the upper guide 50 and lower guide 51 for the lifting rod 52, (Figs. 1, 2 and 4) which is provided with a side extension 54 providing a slot or groove adapted to be engaged by one of the pins 55 secured to the operating disk 16 and provided with rollers 56 as best indicated in Figs. 2 and 4. Extending between the pin 57 on lifting rod 52 and the pin 58 projecting from the guide bracket 51 is the spring 59. Projecting rearwardly from lifting rod 52 is the lifting arm 60 adapted to engage the adjusting screw 62 which extends downwardly from the lug 63 fast upon the rack 65 whose movement is guided by the upper guide 66 and lower guide 67 extending rearwardly from the fixed plate 37. The spring 70 extends from the pin 71 on rack 65 to the pin 72 projecting from lower guide bracket 67. The teeth 74 on rack 65 (Figs. 1, 4, 17) mesh with the teeth on pinion 75 on the shaft 77. The supply of tickets is coiled in a strip upon the spool 80 which is removably pivoted on the pin 82 secured to the cross bar 83 carried by the sides of the frame. The strip of tickets 84 is led upward from the spool 80 around the roller 85 suspended from the top of the casing as best illustrated in Fig. 3 and is led downward therefrom between the feed drums 87 and 88 of the auxiliary feed mechanism which I will next describe.

The auxiliary feeding mechanism draws the strip of tickets from the spool 80 a distance equal to the number of tickets to be delivered to the operator and provides a slack or loose supply which can be drawn upon without straining or tearing as the foremost tickets are ejected from the machine. The shaft 77 has fixed at its left end the clutch member 90 (Figs. 17—18) having the peripheral cam portions 91. Loosely journaled on shaft 77 and encircling clutch member 90 is the outer or gear clutch member 93 adapted to be locked to the inner fixed member 90 by the wedging of rollers 94, so that both members 90 and 93 of the clutch will rotate together when shaft 77 is rotated in the direction indicated by the arrow (Fig. 18) upon the lifting of rack 65; while the reverse rotation of said inner member 90 at the return of rack 65 will cause the rollers 94 to ride down the cam surfaces 91 into the enlarged portion of the cam-ways imparting no movement to the outer clutch member 93. The outer clutch member 93 has exterior teeth 96 engaging the teeth of intermediate pinion 98, journaled on pin 99 projecting from bracket 100. Pinion 98 meshes with the teeth of pinion 102 fixed on the upper roller shaft 103 on which is carried the upper feed roller or drum 87. Coöperating with the upper feed roller to feed the tickets on the elevation of rack 65, lower roller or feed drum 88 is carried on its shaft 105 having a pinion 106 the teeth of which mesh with those of the upper roller pinion 102 by which it is driven. As best shown in Fig. 2 the lower roller shaft is carried in the spring pressed bearings 107, 107 arranged within the bearing blocks 108—108 and engaged by the compression springs 109—109 held in place by the adjusting screws 110—110 whereby the lower feed drum 88 is held in engagement with the upper drum 87 under adjustable spring pressure.

The strip of tickets after being fed by the feed drums 87, 88 is led between the upper and lower rollers 112, 113 (Figs. 3, 4 and 19) into the vertical track formed by the front and rear guides 115 (116—as best shown in Figs. 1, 3, 4, 7 and 14). The ticket strip has opposite side notches 118 at the front and rear of each ticket. As best shown in Figs. 6 and 7, the width of the tickets is greater than the width of the vertical guides 115, 116 to permit the engagement of suitable dogs of the delivery mechanism with the side notches 118.

The delivery mechanism consists of a delivery carriage 120 having at each side the lower or feed dogs 122 and the upper dogs or pawls 123. The four dogs are suitably spaced and pivotally secured on each side of the guide bars 115, 116 to engage the notches 118, dividing the tickets. The carriage 120 is secured to the lower end of the depending rack bar 125 (Figs. 5 and 14). The teeth of said rack 125 mesh with the gear wheel 126 centrally secured on the shaft 77 so that the rotation of said shaft 77 on the lifting of upper rack 65 as above explained raises the lower rack-bar 125 and the carriage 120 thereto affixed. As shown, the central gear 126 on shaft 77 is about four times as large as the pinion by which the shaft 77 is rotated so that the carriage 12 may be raised a distance a trifle more than corresponding to the length and number of the tickets to be delivered. Springs 130 secured on the carriage 120 by the screws 131 are arranged normally tending to force the lower dogs 122 into engagement with the ticket notches 118 to feed the ticket strip on the downward movement of the carriage 120. The springs 130 yield when the carriage 120 is raised so that the dogs 122 leave notches 118 and ride along the edges of the ticket strip. Thus lifting the carriage 120 a trifle more than the length of the selected number of tickets to be delivered will allow a slight idle downward movement of carriage 120 when rack 125 is released; the dogs 122 will then engage the first pair of notches 118 in the ticket strip and feed downward the selected number of tickets. The fall of the carriage 120 to deliver the tickets may be by gravity only or may be aided by the spring 70 one end of which is secured to rack 65 as shown. The tickets when delivered pass through the slotted block 136 having slot 137 for their exit, being guided thereto by the curved lower portions of the guides 115, 116 (Figs. 3 and 14). The purpose of the pair of upper dogs 123 is to so engage two opposite notches 118 in the strip of tickets that a fraudulent or careless operator pulling the strip of tickets from the outside as they are being delivered to him may not secure a greater number of tickets than the value of the coin used warrants. To accomplish this, the two upper dogs 123 (as best shown in Figs. 6 and 7) are pivoted on carriage 120 on each side of the ticket strip. The dogs 123 are provided with short segmental racks 139 meshing with suitable teeth on the operating frame 140 located above carriage 120. The frame 140 is provided with two opposite blocks 142 which are forced into frictional contact with the vertical guide bars 115, 116 by means of the springs 143 which are secured to the frame 140 by the screws 146. The screw studs 145 projecting through horizontal slots in the blocks 142 retain said blocks in position to allow them to be held in constant frictional contact with the vertical guides 115, 116 under the pressure of springs 143. Assuming that the feeding device is in its lowermost position, as indicated in Fig. 6, after the delivery of a number of tickets to the preceding operator, the present purchaser of tickets operating the devices above described, upon the insertion of the selected coin and the rotation of a handle 23 will raise rack 125 and carriage 120 thereto affixed. This movement of carriage 120 will carry upward the pair of dogs 123 which will be shifted outward from the notches 118 in the ticket strip by the engagement of the segmental teeth thereon with the teeth of the short vertical rack on operating frame 140, which will be held stationary by the engagement of its friction blocks 142 with the vertical guide bars 115, 116 until the noses 148 contact with the abutments 150 on the operating frame 140. The operating frame will then be carried upward with carriage 120 until it reaches the position illustrated in Fig. 7 with the lower feed dogs 122 slightly above a pair of notches 118 in the ticket strip. Upon the release of rack 125 the carriage 120 will fall therewith a trifle until the lower dogs 122 engage the first pair of notches 118 in the ticket strip to feed the tickets to the operator. During this slight idle drop of carriage 120, the upper pair of dogs 123 will be shifted inward on their pivots by the delay or drag of the operating frame 140 which will be retarded by the frictional engagement of blocks 142 with vertical guides 115, 116. When, however, the lugs 148 on carriage 120 contact with the lower lugs 149 on operating frame 140, said frame will be carried downward to its lowermost position, as indicated in Fig. 6, the dogs 123 being retained in position in the notches of the ticket strip to act as a stop against unintended withdrawal of tickets by the operator. Thus it will be seen that during the upward movement of the carriage 120 the four dogs 122, 123 will be in the positions indicated in Fig. 7, while during the downward movement of the carriage 120 to feed the tickets, the four dogs will be in the position indicated in Fig. 6. Because of the frictional engagement of operating frame 140 with the vertical guides 115, 116 and the slight distance between the abutment 150 and the lower lug 149 on operating frame 140 the upper set of stop dogs 123 are shifted out of engagement with the notches 118 at the beginning of the upward movement of carriage 120 and are shifted into engagement with said notches at the beginning of the downward movement of carriage 120.

To sever the tickets from their strip at the moment of delivery I provide shears suitably arranged and adapted to be operated by the movement of the carriage 120. As best shown in Figs. 12, 13 and 14 the severing device consists of the fixed and movable blades 152, 153, the fixed blade 152 being secured to a supporting block 155 and the movable blade 153 being fulcrumed on the fixed blade at 156. Secured to arm 157 of the movable blade and to pin 158 extending from the back of the casing is the spring 160 tending to lower the blade 153 to sever the tickets. I elevate blade 153 by the engagement of the latch 165 (Fig. 14) on the lower end of rack 125 with the arm 166 (Figs. 12 and 13) fulcrumed at 167 on the casing back and connected by link 168 with the movable blade 153. The latch 165 as best shown in Fig. 14 is fulcrumed on the lower end of the rack bar 125 and adapted to be tripped by engagement with the arm 166 permitting it to pass said arm on the downward movement of the rack 125 while it is rigid on the upward movement and lifts the arm 166 to elevate the blade 153. To retain the blade in its elevated position during the further rise of the carriage and during the delivery of the tickets, I provide the catch 169 fulcrumed on pin 170 secured on the casing back, and provided with the engaging shoulder 171 adapted to engage the inturned lug 173 provided therefor on the end of the blade 153 when the same is raised. The spring 174 attached to arm 175 of the catch lever 169 and to pin 176 on the casing forces the catch 169 into engagement to retain the blade 153 elevated. To release the blade to sever the tickets the catch arm 175 is provided with the inturned arm 178 in position to be engaged by the bottom of the rack 125 when it reaches its extreme lower position to rock the catch lever 169 and disengage the shoulder 171 from the blade lug 173, releasing the blade to sever the tickets. This operation is best shown in Figs. 12 and 13,—Fig. 12 illustrating the upper position of blade 153 and Fig. 13 showing its lower position.

180 is a catch or stop (Fig. 14) fulcrumed in holder 181 secured to the rear guide 116 and extending through a slot 182 therein to engage the strip of tickets to prevent a backward movement of the tickets with the delivery carriage 120 when the same is raised.

Posts 185 are positioned under the pawl operating frame 140 to act as a stop to limit the downward movement of the frame 140 and carriage 120.

To prevent the insertion of coins in the coin apertures after the supply of tickets has been exhausted slide plate 186 (Figs. 8 and 9) is arranged in a suitable slide-way 187 immediately above the coin receiving devices and provided with coin apertures 188, 188', 188'' spaced to coincide with the coin slots of the ledge 5 and the coin receiving devices and held normally in alinement therewith, against the action of spring 190 surrounding pin 191 and confined between the casing 10 and slide lug 192, the spring 190 normally tending to close the slots by shifting the slide into the position shown in Fig. 9. Referring to Figs. 3, 4 and 19 it will be seen that the shaft of roller 112 is carried on bracket 194, fulcrumed at 195 on the plate 37 and connected by rod 196 attached to its rear end to the lower arm 197 of bell crank lever 198 fulcrumed at 199 on bracket 200, whose upper arm engages the slide plate lug 192 on the opposite side from the spring 190 so that elevation of roller 112 will rock the bracket 194 upon which it is carried to cause the bell crank lever to force the slide 186 into the position shown in Fig. 8 compressing the spring 190 and maintaining the coin slots open. As best shown in Fig. 19, roller 112 is held in elevated position by the strip of tickets 84 which passes between rollers 112 and 113. When the last ticket has passed rollers 112 and 113 roller 112 is allowed to drop slightly thus releasing the spring 190 to shift the slide 186 to close the coin slots. 202, 202 (Fig. 19) are guides for the ticket strip secured to the ends of the roller bracket 194.

As best shown in Figs. 4, 5, 15 and 16, a coin catch 205 is employed in connection with each of the coin receiving devices to arrest a number of coins in a suitable passageway 206, having a glass front 207 so that their display may deter fraudulent purchasers from using false coins or slugs to operate the machine. To avoid confusion in the drawings, only one of such devices is shown completely, viz., that employed in connection with twenty-five cent coins, (Fig. 4). As the coins drop from operative engagement the guideway 208 carries them to passageway 206, turning them ninety degrees. We will assume that the machine is about to be operated by the use of a twenty-five cent coin, three coins being exposed to view already in passageway 206. The lowermost coin is supported by lower arm 209 of the rocking frame or coin catch 205 supported on the rock bar 210, which is fulcrumed at 211 and connected to the spring 212 tending to shift it upward. The two upper arms 213 of coin catch 205 spread apart a distance about two-thirds the diameter of the coin. When, therefore, the rock bar 210 is released and shifted upward by spring 212, the two upper arms 213 are carried forward to uphold the middle coin while the lower arm 209 is withdrawn to release the lower coin which falls through suitable guideways to the coin receptacle at the bottom of the casing (Fig. 16). When rock bar 210 is again depressed against the pull of spring 212, the upper arms 213 are withdrawn to release the upper coins, the lowermost of which falls upon lower arm 209 which thus supports the three coins in position behind glass front 207 (Fig. 15). The inner end of rock bar 210 is connected by the link 214 with an upper pivoted lever 215, which extends beneath the lifting arm 60, so that at each operation to raise said lifting arm 60, for the delivery of tickets, the rock bar 210 will be released to permit the spring 212 to rock the coin catch 205. When lifting arm 60 is returned to its original position upon the release of the coin from the operating device, it will depress rock bar 210 and shift the coin catch 205 to its original position. Each denomination of coins has its passageway and coin catch released upward and depressed in like manner by the movement of the lifting arm operated by its particular mechanism.

To secure the delivery of a single ticket upon the insertion of a five cent coin, the operator inserts the coin in the coin slot 6 and rotates the corresponding handle 23 to revolve operating disk 15. As best illustrated in Fig. 2, the resulting upward movement of lifting rod 250 will be one-fifth the distance of the upward movement of lifting rod 52, operated upon the insertion of a twenty-five cent coin as already explained. Extending inward from the lifting rod 250 is the lifting arm 251 (Fig. 10), which projects under the adjusting screw 252 extending downwardly from lug 253 fast upon rack 65, which will be raised a sufficient distance to feed and deliver the strip of tickets a distance corresponding to the length of a single ticket,—the operation otherwise corresponding to that above described in connection with the use of a twenty-five cent coin. Upon the insertion of a ten cent coin or dime into its coin slot 8, and the turning of the corresponding operating handle 23, lifting rod 256 will be raised a distance equal to two-fifths of the upward movement of lifting rod 52, which is operated by the twenty-five cent coin. The arm 257, extending inwardly from lifting rod 256 underlies adjusting screw 258 projecting downward from lug 259 fast upon rack 65. Thus, by employing a ten cent coin the parts will be operated to feed and deliver the strip of tickets a distance corresponding to the length of two tickets. Each of the operating disks 15, 16 and 17 have circumferential ratchet teeth engaged by spring pressed pawls 261 permitting rotation only in the direction to accomplish the feeding and delivery of the tickets.

From the above description it will be seen that my apparatus is designed to sell tickets in number corresponding to the value of the coin employed. For each of the three different coins a separate mechanism is provided, but all these mechanisms engage lugs extending from rack 65 which is lifted by the use of the selected coin a distance varying proportionally to the value of the coin employed.

As above explained, the upward movement of rack 65 serves to feed the strip of tickets from its main storage coil to the loose hanging loop 270 (Fig. 4). While the strip of tickets is being fed from its storage coil, the lower rack 125 is raised a distance slightly exceeding the length of the number of tickets to be delivered, carrying with it carriage 120 and operating frame 140, and raising blade 153 to its upper position, illustrated in Fig. 12. The lower portion of the ticket strip between the guides 115, 116 remains stationary during the raising of rack 125, being prevented from accidental upward movement by the catch 180, which, as will be readily understood from Fig. 14, prevents only an upward movement of the strip of tickets while permitting their delivery downward. As soon as a coin has been inserted through a coin slot, and the corresponding operating handle 23 rotated, the locking device, best illustrated in Figs. 5, 8 and 9, will prevent (until the preceding tickets have been delivered) the operation of the machine by a purchaser who by mistake inserts a coin in another coin slot. This locking device is not my invention. It is intended to protect the same under an application for patent by the inventor. I will nevertheless, for the sake of clearness, describe its operation briefly.

Referring to Fig. 8, it will be seen that a five cent coin has been inserted and the operator has partially rotated the corresponding handle 23. As soon as the movable shell 14 is turned from its initial position, the upper locking lever 35 will be shifted by having its nose 38 expelled from the notch 33 in the annular collar 32, connected to the shell 14. The other nose of lever 35 will descend into the notch 33 in the annular collar belonging to the ten cent coin receiving apparatus, locking the same against rotation until the five cent handle has been turned 180 degrees to free its coin and bring the opposite notch 33 to the top and beneath the nose 38 of upper locking lever 35, freeing the same so that the ten cent apparatus may be operated. The lower locking levers 40 and 43 operate similarly. They extend respectively from the twenty-five cent coin apparatus to the right and left, engaging the ten cent apparatus and the five cent apparatus, so that upon the insertion of a coin into any one of the coin receptacles and the rotation of the proper handle, the other two coin receiving devices will be locked against operation.

By employing an auxiliary feeding device to feed the tickets directly from the storage coil to a loose loop during the first portion of the operation of the machine by the rotation of a handle 23 against spring action, I provide an intermediate supply of tickets which can be drawn upon with a minimum of resistance when the coin is released and the parts returned to their initial position to deliver the tickets to the operator. This delivery will be a quick movement under the influence of gravity and springs. The severance of the tickets delivered takes place at the instant when the delivery has been accomplished.

By providing devices for closing the coin slots when the strip of tickets has passed rollers 112, 113, it is assured that a purchaser will never insert a coin and operate the machine without securing the desired number of tickets, inasmuch as the coin slots will be closed before the tickets in the vertical passage between guides 115, 116 are exhausted.

The last three coins of any denomination which have been employed to operate the machine will be exposed to the view of the public or an inspector through the glass plates 207, thus augmenting the chance of detecting fraud.

What I claim as new and desire to secure by Letters Patent is:

1. In a vending machine adapted to vending flexible articles in a strip, means for retracting the delivery devices by hand and simultaneously pushing the strip from its main supply to form an intermediate loop free from tension and from which it can be withdrawn without strain or tension, and automatic means for feeding the strip from its intermediate position toward the point of delivery to the operator.

2. In a vending machine adapted to vend flexible articles connected in a notched strip, a delivery device engaging the notches and sliding rearwardly along the edge of the strip, means to shift the delivery device rearwardly into operative position, means to retain the strip in fixed position during the shifting of the delivery devices to operative position, means to operate the delivery device to eject the forward portion of the strip from the machine, and a stop device likewise engaging notches in the strip during a feeding movement to prevent excessive withdrawal of the strip by the operator.

3. In a vending machine adapted to vend flexible articles connected in a strip, a delivery carriage provided with means to engage the strip to feed the same and an auxiliary frame carried by and movable on said carriage and provided with means to engage the strip to prevent excessive delivery thereof.

4. In a vending machine adapted to vend flexible articles connected in a strip, a delivery carriage provided with means to engage the strip during its movement in the feeding direction, but to ride along the strip during its return to operative position, and a frame provided with a friction member adapted to throw in and out of engagement means to prevent excessive delivery of the articles to be vended.

5. In a vending machine adapted to vend flexible articles connected in a strip, a delivery carriage provided with means to engage the strip, to effect delivery, and also provided with means to prevent excessive delivery, and a friction device adapted to throw in and out of engagement the means to prevent excessive delivery.

6. In a vending machine adapted to vend flexible articles connected in a strip, a delivery carriage carrying means to engage the strip to prevent excessive delivery thereof, and a friction device whose retardation by friction during the movement of the delivery carriage in one direction serves to throw the means to prevent excessive delivery out of engagement while its retardation during the movement of the delivery carriage in the opposite direction serves to throw the means for preventing excessive delivery into engagement with the strip of flexible articles.

Signed at Boston in the county of Suffolk and State of Massachusetts this 5th day of January A. D. 1909.

HARRY H. DANIELS.

Witnesses:
VINCENT E. ENGELVOCH,
BENJ. H. MASON.